(12) United States Patent
Kubota et al.

(10) Patent No.: US 9,356,444 B2
(45) Date of Patent: May 31, 2016

(54) POWER CONTROL DEVICE

(75) Inventors: Eiichiro Kubota, Tokyo (JP); Antonio Avitabile, Basingstoke (GB); Costantino Cristiano Mariella, London (GB); Christopher Michael Rutherford, Brussels (BE); Edward Grellier Colby, Cambridge (GB); Nicholas George Bailey, Cambridge (GB); Alexander Charles Knill, Cambridge (GB); Harshul Deepak Mehta, Cambridge (GB)

(73) Assignee: SONY CORPORATION, Tokyo (JP)

( * ) Notice: Subject to any disclaimer, the term of this patent is extended or adjusted under 35 U.S.C. 154(b) by 627 days.

(21) Appl. No.: 13/806,497

(22) PCT Filed: Jun. 29, 2011

(86) PCT No.: PCT/JP2011/065412
§ 371 (c)(1),
(2), (4) Date: May 6, 2013

(87) PCT Pub. No.: WO2012/005274
PCT Pub. Date: Jan. 12, 2012

(65) Prior Publication Data
US 2013/0214608 A1   Aug. 22, 2013

(30) Foreign Application Priority Data

Jul. 9, 2010   (JP) ................. P2010-156638

(51) Int. Cl.
*H02J 1/00* (2006.01)
*H02J 3/32* (2006.01)
*H02J 3/38* (2006.01)

(52) U.S. Cl.
CPC ... *H02J 1/00* (2013.01); *H02J 3/32* (2013.01); *H02J 3/383* (2013.01); *Y02B 10/14* (2013.01); *Y02E 10/563* (2013.01); *Y02E 10/566* (2013.01); *Y02E 70/30* (2013.01); *Y10T 307/707* (2015.04)

(58) Field of Classification Search
CPC .......... Y02E 10/50–10/58; H02J 3/383–3/385; H01L 31/02021
See application file for complete search history.

(56) References Cited

U.S. PATENT DOCUMENTS

| 2004/0085785 A1* | 5/2004 | Taimela | .................... H02J 3/32 363/37 |
| 2011/0273130 A1* | 11/2011 | Lee | ..................... H01M 10/465 320/101 |

FOREIGN PATENT DOCUMENTS

| CN | 2727834 Y | 9/2005 |
| JP | 2002-354677 | 12/2002 |

(Continued)

OTHER PUBLICATIONS

Chinese Office Examination Report issued in connection with related Chinese patent application No. CN 201180032949.4 dated Aug. 5, 2014.

*Primary Examiner* — Kenneth B Wells
*Assistant Examiner* — Rafael Pacheco
(74) *Attorney, Agent, or Firm* — Chip Law Group

(57) ABSTRACT

To solve problems arising when a power conditioner equivalent to that connected to a solar panel is connected to a power storage device.
Direct-current power generated by the solar panel 9 is supplied to a DC-DC converter 51 and output as a predetermined direct-current voltage. The output voltage of the converter 51 is supplied to a DC-AC inverter 52. Direct-current power generated by the power storage device 11 is supplied to a DC-DC converter 55. Predetermined direct-current power from the converter 55 is supplied to a DC-AC inverter 56. Alternating-current power output by the inverter 56 is supplied to an alternating-current power system at home. The converter 55 is configured to have two output voltages. The first output voltage is a standby voltage. The second voltage is a voltage at which the inverter 56 starts power supply to outside.

7 Claims, 6 Drawing Sheets

(56) References Cited

FOREIGN PATENT DOCUMENTS

| | | |
|---|---|---|
| JP | 2003-189477 | 7/2003 |
| JP | 2008-042999 | 2/2008 |
| JP | 2008-141949 | 6/2008 |
| JP | 2009-205288 | 9/2009 |

* cited by examiner

POWER CONTROL DEVICE

TECHNICAL FIELD

The present invention relates to a power control device applied to control of storage and supply by a power accumulating device installed at home, for example.

BACKGROUND ART

Recently, there are demands for reducing energy consumption in factories and offices (buildings) and at home. According to statistical data on energy consumption, the ratio of energy consumption by all households to total energy consumption is relatively high, and reduction in energy consumption at home has been an issue. A technique to manage energy consumption at home is called an HEMS (Home Energy Management System). The conventional HEMS is for providing energy saving measures such as on-off control of electrical appliances such as air conditioner and collection of logs of power consumption and the like.

Meanwhile, power generation utilizing renewable energy in place of fossil fuels is becoming into practical use and this trend looks set to be stronger in the future. Examples of power generation utilizing renewable energy that is being developed include photovoltaic power generation, wind power generation, biomass power generation, and wind power generation. Indeed, installation of solar panels on roofs, walls and the like for photovoltaic power generation at home is being widely spread.

A solar panel is usually connected with a power conditioner including a DC-DC converter and a DC-AC inverter as disclosed in Patent Document 1.

CITATION LIST

Patent Document

Patent Document 1: Japanese Patent Application Laid-Open No. 2008-141949

SUMMARY OF THE INVENTION

Problems to be Solved by the Invention

It can be considered to store power generated by photovoltaic power generation in a storage battery installed in each home and supply power to loads at home. When a solar panel and a storage battery are both connected to a home power network, a power condition having the same configuration as that connected to the solar panel is also connected to output of the storage battery.

A DC-DC converter for a solar panel has a function of MPPT (Maximum Peak Point Tracking: a function for maximum peak point tracking control that is control to track a peak point of output power from the solar panel) for adjusting output impedance to impedance of the solar panel under input light at any given time.

Furthermore, there is a certain amount of delay between DC input to and AC output from a DC-AC inverter. These characteristics are not preferable for a power conditioner connected to output of a power storage device.

It is therefore an object of the present application to provide a power control device capable of solving problems arising when a power conditioner equivalent to that connected to a solar panel is connected to a power storage device.

Solution to Problems

A device according to the present disclosure is a power control device including:
a direct-current power storage;
a first power conditioner connected to the storage;
a direct-current power generator;
a second power conditioner connected to the generator; and
an alternating-current power system to which alternating-current power from the first power conditioner is supplied and to which alternating-current power from the second power conditioner is supplied, wherein
the first power conditioner includes a DC-DC converter and a DC-AC inverter, the DC-DC converter generates first and second outputs, the first output makes the DC-AC inverter enter a standby state, and the second output makes the DC-AC inverter output alternating-current power to the alternating-current power system.

Effects of the Invention

According to at least one embodiment, it is possible to prevent a delay before an output is generated and avoid unstable operation when a power conditioner having the same configuration as that connected to a solar panel is connected to a power storage device.

MODE FOR CARRYING OUT THE INVENTION

An embodiment of the present invention will be described below. The description will be in the following order.
<1. Embodiment>
<2. Modified Examples>

Note that the embodiments to be described below are a specific preferred example of the present invention and limited in various technically preferred manners but that the scope of the present invention is not limited to these embodiments unless there is a statement particularly indicating that the present invention is limited.

<1. Embodiment>
"Example of Power Control System"

Figure 1:
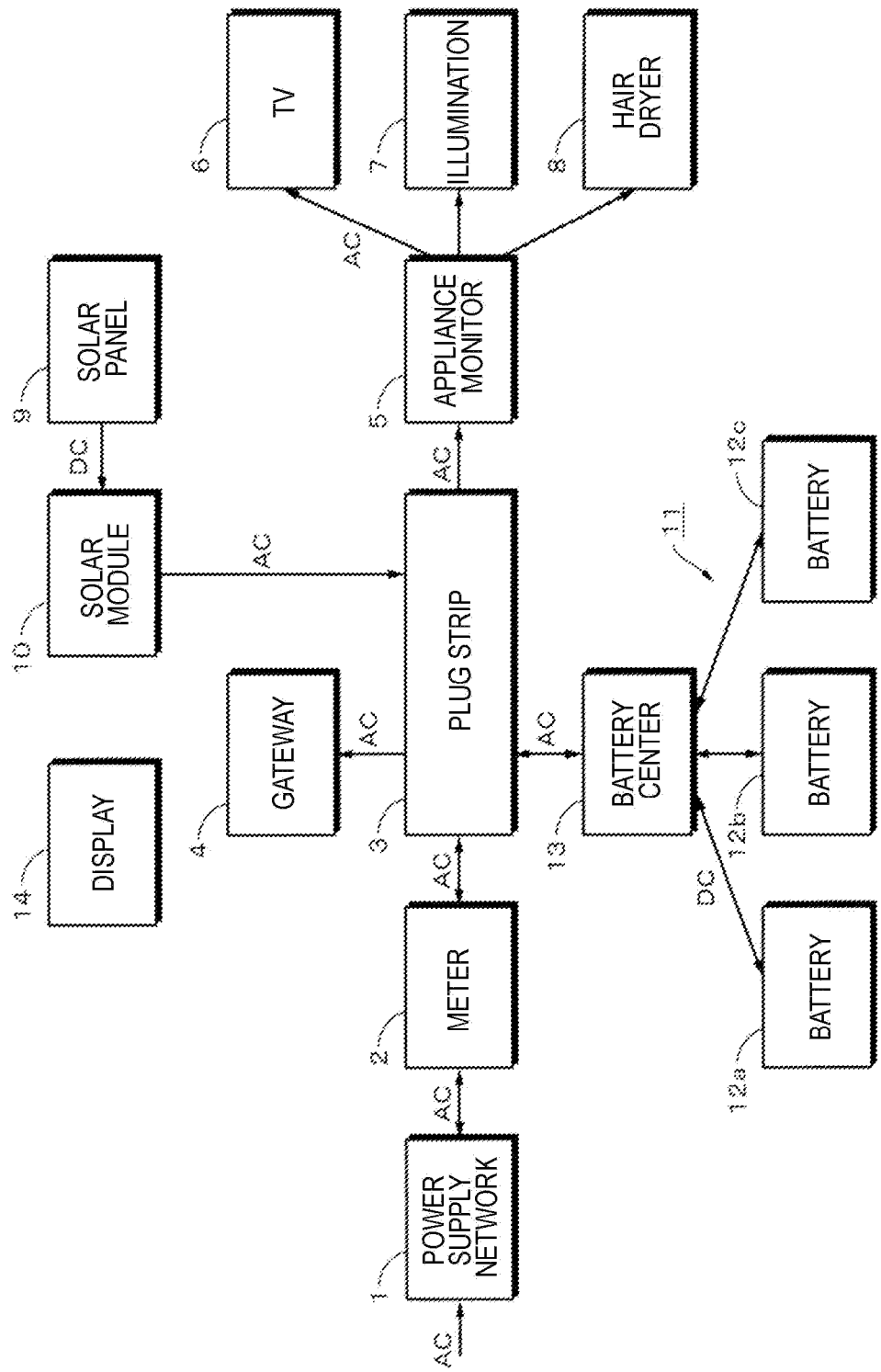
FIG. 1 is a block diagram illustrating a power system of an embodiment of a power control system according to the present invention.
Figure 2:
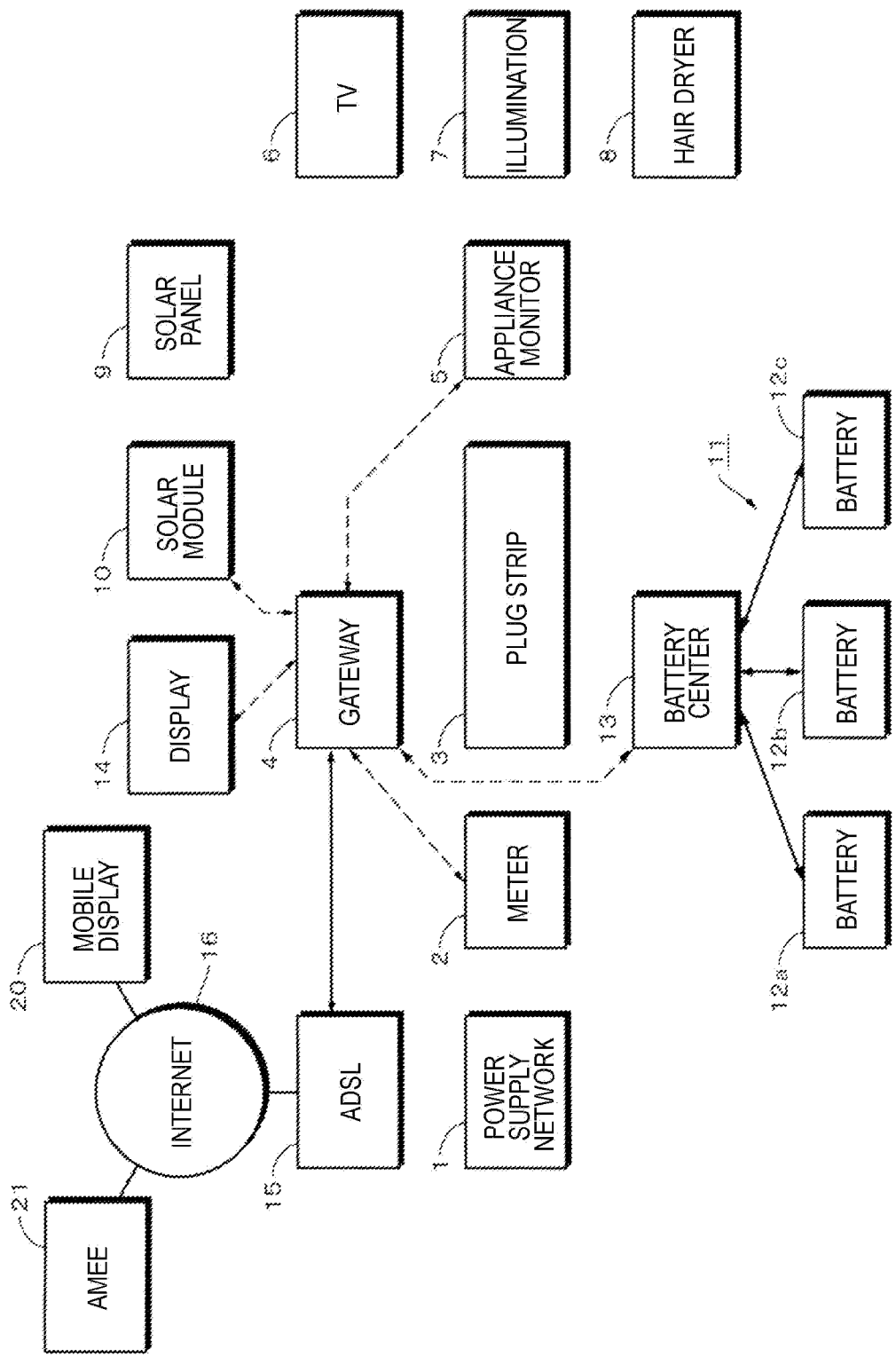
FIG. 2 is a block diagram illustrating a communication system of the embodiment of the power control system according to the present invention.
Figure 3:
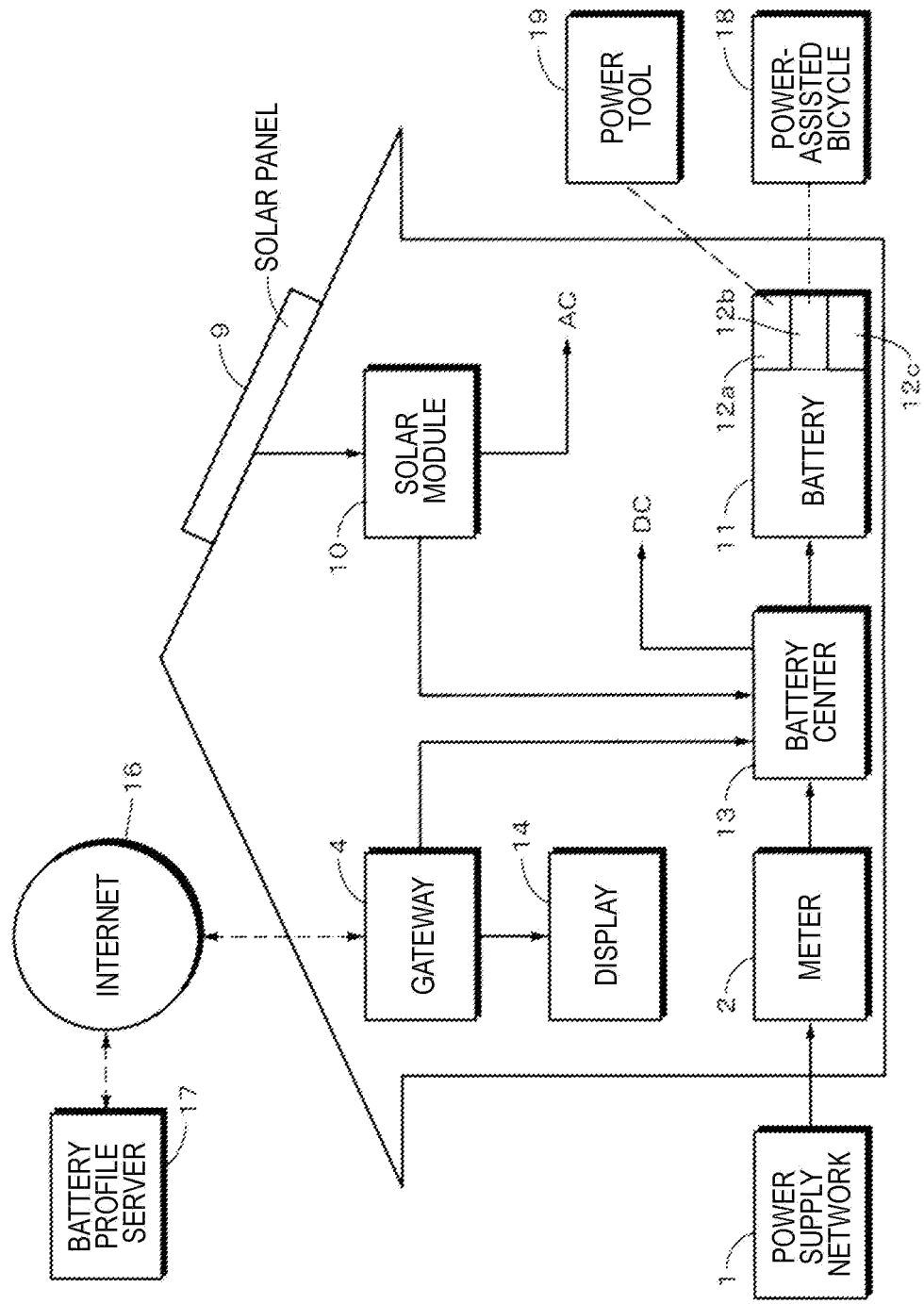
FIG. 3 is a block diagram used for conceptually explaining the power system according to the embodiment of the present invention.

An example of a power control system for a divided area such as home will be described with reference to FIG. 1. FIG. 1 illustrates power supply paths, and transmission paths for information data, control signals and the like are illustrated in FIG. 2. Furthermore, FIG. 3 is used to illustrate a concept of a home power network. A direct current (DC) and an alternating current (AC) are presented as types of power. For example, an alternating-current power of 220 V (60 Hz) flows in a home power network.

Power generated by a power plant is brought to home via a power supply network 1 and through a home power meter 2. The power plant is a thermal power plant, a nuclear power plant, or the like. The $CO_2$ emission of power supplied to home via the power supply network 1 varies depending on the power generation method. Furthermore, the purchase rate at which a home owner buys power supplied from a power supply company varies depending on time zones in a day. For example, the power rate at night when power demand is low is set lower than that at daytime.

As illustrated in FIG. 2, the power meter 2 is connected to a gateway 4 of the home power network via a wireless LAN (Local Area Network), for example. Devices that are connected via a wireless LAN are authenticated by mutual authentication. Furthermore, data transmitted through wireless LANs are encrypted so as to ensure the security thereof. Paths in solid lines in FIG. 2 represent communication paths through wired LANs while paths in broken lines represent communication paths through wireless LANs.

The power meter 2 accurately measures power supplied via the power supply network 1 to home at predetermined intervals and transmits the measured value to the gateway 4 of the home power network through the wireless LAN by means of a communicating unit. In this case, the measurement time is also transmitted as a time-stamp accompanying the measured value. Time is time information common in the power network. For example, a reference time source is provided in the power network.

Commercial power supply brought into home through the power meter 2 is supplied to a plug strip 3. The plug strip 3 is an instrument having a plurality of power plugs for supplying alternating-current power. Alternating-current power is supplied to the gateway 4 and an appliance monitor 5 through the plug strip 3. Alternating-current power is supplied to home electrical appliances such as a television set 6, an illumination 7 and a hair dryer 8 through the appliance monitor 5. Note that these electrical appliances are exemplary only; more kinds of electrical appliances are used at home in practice.

The appliance monitor 5 measures power consumption of each of the electrical appliances connected thereto at predetermined intervals such as at one-second intervals. The measured power consumption information of each electrical appliance and a time-stamp indicating the measurement time are transmitted from the appliance monitor 5 to the gateway 4 via wireless communication.

Direct-current power generated by a solar panel 9 made of solar cells is supplied to a solar module 10. Alternating-current power in synchronization with alternating-current power at home is generated by the solar module 10. The generated alternating-current power is supplied to the plug strip 3. At the plug strip 3, the alternating-current from the power meter 2 and that from the solar module 10 are added and used as power at home. The power generator is not limited to the solar panel 9 but a wind power generator or the like that generates power using renewable energy may be used as the power generator.

The solar module 10 is connected to the gateway 4 via a wireless LAN. The solar module 10 measures the direct-current power generated by the solar panel 9 and the alternating-current power obtained by converting the direct-current power and supplied to the power network. The measured value and a time-stamp indicating the measurement time are transmitted from the solar module 10 to the gateway 4 via wireless communication.

A power storage device 11 including three batteries 12a, 12b and 12c, for example, is provided as a home power accumulating device. The batteries 12a to 12c are lithium ion batteries, for example. An electric double layer may be used as the power storage device 11. In order to control operation such as charging and discharging of the batteries 12a, 12b and 12c of the power storage device 11 and to convert the direct-current power stored in the power storage device 11 into alternating-current power, a battery center 13 is provided. The power storage device 11 and the battery center 13 are connected via a wired interface. For example, an SPI (Serial Peripheral Interface) can be used. The alternating-current power from the battery center 13 is supplied to the plug strip 3.

The battery center 13 has a plurality of sockets as physical connectors. The batteries 12a, 12b and 12c are inserted into and removed from respective sockets. Different types of batteries may be used as the batteries 12a, 12b and 12c. For example, lithium ion batteries, capacitors, fuel cells and microgenerators may be used. Each battery can be uniquely identified by a secure battery identifier (battery ID). Even different types of batteries can be all inserted into the sockets that are standardized.

The sockets ensure physical connections and also ensure interfaces between the batteries 12a, 12b and 12c and the battery center 13. The battery center 13 controls the states of the batteries 12a, 12b and 12c and monitors the safety and the reliability thereof. The battery center 13 is connected with the gateway 4 via a wireless LAN. The gateway 4 receives information from the battery center 13 and transmits control signals relating to the batteries 12a to 12c to the battery center 13.

As illustrated in FIG. 3, the gateway 4 is connected to a battery profile server 17 on the Internet 16 via an ADSL (Asymmetric Digital Subscriber Line) 15. The gateway 4 can charge a battery safely and properly by receiving storage information associated with the battery ID thereof from the server 17. Furthermore, information on results of use (number of charges, trouble, etc.) of batteries is transmitted from the gateway 4 to the server 17 so that storage information in a database of the server 17 is updated with the latest information.

As illustrated in FIG. 3, the respective batteries are removable from the battery center 13, and used for other uses after being removed. Specifically, the batteries may be used as power sources of electric equipment such as a power-assisted bicycle 18 or a power tool 19. Since the batteries can also be used as power sources in addition to home storage batteries and the control and the charging device are common to a plurality of types of batteries, it is possible to provide low cost home storage batteries without reducing the safety.

A display 14 is connected to the gateway 4 via a wireless LAN, and display information is transmitted from the gateway 4 to the display 14. The display 14 displays information as in the following examples or part of the states thereof to users at home:

power supplied to home from the power supply network 1;
    power supplied from the solar panel 9;
    net power flowing to the battery center 13;
    states of batteries on the battery center 13;
    power consumed by home electrical appliances;
    ratio of green power to non-green power in used energy;
    real-time carbon intensity of power consumed; and
    carbon footprint of power consumed by home power network (for example, a value obtained by accumulating greenhouse gas emissions (carbon intensities) for one month is displayed as the carbon footprint so that the carbon emission is visualized).

The information described above that is displayed by the display 14 can also be displayed by a mobile display 20 on the Internet 16. The mobile display 20 is a mobile phone, a portable personal computer or the like. Furthermore, it is possible to transmit control signals for controlling the power network to the home gateway 4 by using these portable terminals.

"Time-Stamp Accompanying Measured Data"

The information to be displayed on the display 14 as described above is generated by processing measured values (with time-stamps) transmitted via wireless LANs from the power meter 2, the appliance monitor 5, the solar module 10 and the battery center 13 by the gateway 4. At the gateway 4, power consumptions are synchronized with one another using the time-stamps. Furthermore, an accumulated value of power consumptions along the time direction is calculated. A power measuring device that satisfies a predetermined specification is used to ensure the accuracy. Furthermore, accurate measurement of power is a basis of a function of informing the householder of numerical data obtained by accurately adjusting and converting energy consumed at home into emission of carbon dioxide.

A typical example of monitoring usage of energy at home is to display accumulated total energy consumption in a certain period (hour) on a display. Since a measured value is data accompanied by a time-stamp representing the measurement time, an instantaneous power P when it is assumed that two measured values are acquired can be obtained by dividing the difference between the two measured values $E_1$ and $E_2$ of energy by the difference between times $T_1$ and $T_2$.

$$P=(E_2-E_1)/(T_2-T_1)$$

As a result of obtaining the accumulated value of data, it is possible to ensure the information even if failure of a device or the like due to power failure occurs. With a system that handles data as power, accumulation including a period during which measurement could not be performed results in estimation even if only one piece of data is missing, and therefore the conversion and adjustment of the total energy consumption is not accurate. With a system based on information connected with time-stamps representing measurement times, it is possible to recover from failure and to restore the accuracy of conversion.

"Control of Power Control System from Outside"

Furthermore, remote control of the power storage device 11 from outside is possible by a mobile terminal on a network via the Internet 16 and the gateway 4. A simple example of applications making use of this advantage is that a householder operates the power accumulating device from outside to flexibly changing the operation of the system according to the behavior of the householder. In a case where the householder has gone out and it is expected that power consumption will be higher than usual when he/she goes home, he/she can instruct the power storage device 11 from outside his/her house to store energy in advance. Furthermore, in a case where the householder leaves his/her house during vacation or the like, for example, it is possible to have a long-term contract to entrust a public utility company (power company) with control of power storage.

"Control of power storage device based on carbon intensity of energy used"

The carbon intensity may be obtained by accessing a server on the Internet 16, specifically an API (Application Program Interface), transmitting information on power consumption or the like at home to the API and calculating the carbon intensity at the API. An example of the API is an AMEE (Avoiding Mass Extinctions Engine) 21. The AMEE 21 collects energy data around the world and saves energy consumption data in various forms that are collected over a long period of time. The gateway 4 can obtain information on CO2 emissions of one's own home according to a profile defined by the AMEE 21.

The gateway 4 can control when to store energy as power in the power storage device 11 and when to supply the energy from the power storage device 11 on the basis of the carbon intensity calculated by itself or by the API. Furthermore, the gateway 4 can control the proportion of storage and supply.

An example of a rule for control based on the carbon intensity will be described. This rule is an algorithm that minimizes the total carbon intensity of power consumption. The power control system described above is configured to store power in the power storage device 11 only when the carbon intensity of supplied energy is lower than a certain threshold. When the carbon intensity is high, power is supplied from the power storage device 11. Such a power control system can allow the householder to consume energy with lower carbon emissions.

In the power control system, the carbon intensity of energy to be used is obtained as a net carbon intensity on the basis of energy generated by the power generator (solar panel 9) installed at each home in addition to energy supplied from outside (power company). The carbon intensity varies depending on how the energy is generated. Energy with lower carbon intensity is preferable as the energy to be stored in the power storage device 11. The information on the carbon intensity of energy supplied from the power company can be obtained not only from the power company but also from the AMEE described above, for example.

Two types of costs are required for storage of power in the power control system. The first cost is the cost of stored power itself. The second cost is the cost caused by the life (degradation) of batteries used for power storage. In addition, for determining a rule on the timing and the frequency of charging, both of the cost of power and battery replacement should be considered. According to the power control system, it is also possible to compensate for extra cost caused by degradation of batteries due to quick recharge by quickly storing energy when the carbon intensity is low.

"Control of Power Storage Device Based on Purchase Rate"

In control of the power storage device 11, the purchase price of energy is considered. The purchase price of energy (power) varies depending on time zones in a day, the seasons and the like. The power control system calculates the power storage at home and the purchase price of energy offered by the power company. The purchase price is varied to adjust the balance of supply and demand of power by the power company and according to the spot prices in the power market.

Consumers can obtain information of the purchase price from the power company. The power control system defines rules for controlling when to store energy as power and when to supply the energy. Furthermore, the power control system can control the proportion of the storage and the supply. The power control system is configured to store power only when the purchase price for the consumer of the supplied energy is lower than a certain threshold. Such a power control system is useful for the householder to minimize the cost for energy consumption at home.

The rule determining when to store energy as power and what charge rate to be used is determined considering the costs for the storage, that is, both of the cost of the power itself and the battery life. According to the power control system, it is also possible to compensate for extra cost caused by degradation of batteries due to quick recharge by quickly storing energy when the purchase price for the consumer is low.

"Example of Display by Display"

Figure 4:
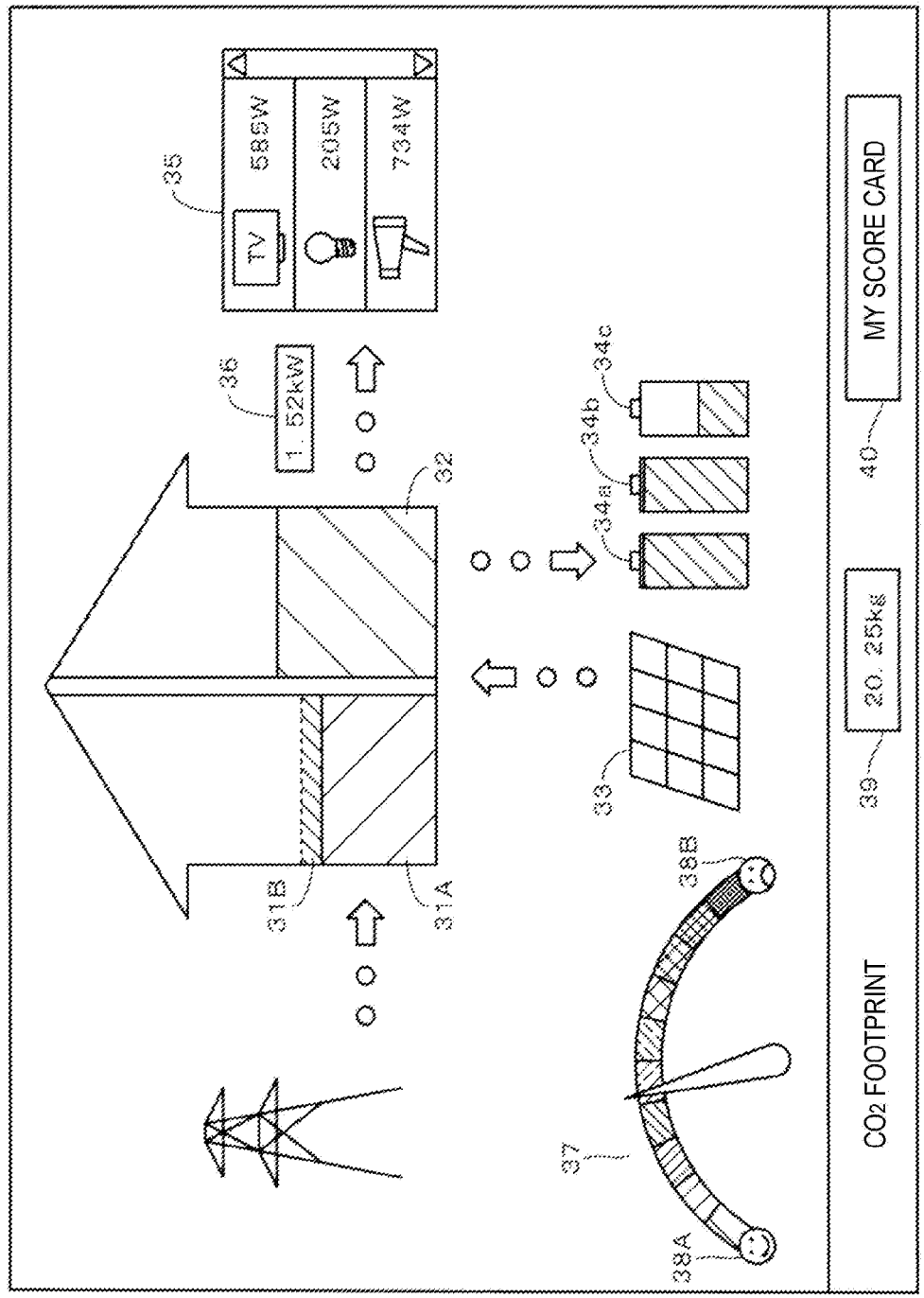
FIG. 4 is a schematic diagram of display on a display according to the embodiment of the present invention.

An example of display by the display 14 will be described with reference to FIG. 4. The display by the display 14 is performed by a color display. A mark of a house is displayed substantially in the center of a display area. The mark of the house is divided into two, and a display 31A of the amount of power supplied from the power supply network 1 to the home is presented on the left half thereof in the drawing. Since this power is usually non-green power (power with a relatively high carbon intensity), this is presented in red. If, however, green power (power with a relatively low carbon intensity) exists in power supplied from the power supply network 1, a display 31B (green) according to the amount of green power is presented as illustrated by a broken line. These displays 31A, 31B and 32 are animation displays changing in real time.

The display 32 corresponding to the amount of green power generated by the solar panel 9 (represented by an icon 33 in FIG. 4) is presented on the right half in the drawing. Furthermore, icons 34a, 34b and 34c respectively corresponding to the three batteries, for example, of the power storage device 11 and representing storage amounts thereof are displayed. Still further, an area 35 for home electrical appliances is provided and icons of respective electrical appliances in operation and current power consumptions thereof are displayed in the area 35. A display 36 of the current total power consumption is presented.

Furthermore, an indicator 37 is displayed. The position indicated by a hand mark of the indicator 37 represents the greenness (cleanness) of the amount of power currently supplied to home. An icon 38a at the left end of the indicator 37 is a position where the greenness is best and an icon 38b at the right end is a position where the greenness is worst. Accordingly, the greenness is better as the hand mark comes to the left and the greenness is worse as the hand mark comes to the right.

A display 39 of the carbon footprint is presented in a lower are of the display area. The carbon footprint is a value obtained by converting the total power consumed in a predetermined period such as one month at the home into CO2 emission. As described above, when the CO2 emission is obtained, the carbon footprint is obtained considering the carbon intensity of power depending on the generation method thereof.

A display 40 of my-score-card is presented in a lowermost area of the display area. The score displayed in the display 40 of my-score-card is a significant value for the interest of the user (owner of the house). For example, the score is a basis of an environmental subsidy supplied by the government. Alternatively, the score may be traded in a trade market of CO2 emissions.

"Regarding Greenness Gauge"

As described above, the display 14 displays the total carbon intensity of power consumed at home. The total carbon intensity is presented in a form of a gauge. Calculation of variables for obtaining the gauge can take not only the energy supplied from outside (power company) but also energy generated by solar cells or a CHP (Combined Heat and Power) equipment installed at each home into account. For example, the gauge is calculated by the following equation. E represents the energy amount and C represents the carbon cost.

$$G = \Sigma E(\text{supply}), E(\text{solar}), E(\text{CHP}), E(\text{battery})/\Sigma C(\text{supply}), C(\text{CHP}), C(\text{battery})$$

In this calculation, it is assumed that the "carbon cost" for power obtained from the solar cells is zero or that occurring in installation thereof. The "carbon cost" of the power supplied from the batteries can be considered as accumulation of the "carbon cost" of power for charging, a specific "carbon cost" at each use of the batteries and/or a ratio of the specific "carbon cost" at each use of the batteries to the whole carbon cost.

Furthermore, the gauge may contain information on the total power consumption. In this manner, the gauge can be an indicator indicating whether or not the carbon use at the home is efficient. A calculation formula of another gauge is presented as follows.

$$G = \Sigma E(\text{supply}), E(\text{solar}), E(\text{CHP}), E(\text{battery})/\Sigma E(\text{supply}), E(\text{solar}), E(\text{CHP}), E(\text{battery}) + \Sigma C(\text{supply}), C(\text{CHP}), C(\text{battery})$$

The display of the display 14 described above allows the householder to immediately know at home the balance between the energy supplied from outside (power company) and the energy generated at each home.

"Power Conditioners"

Figure 5:
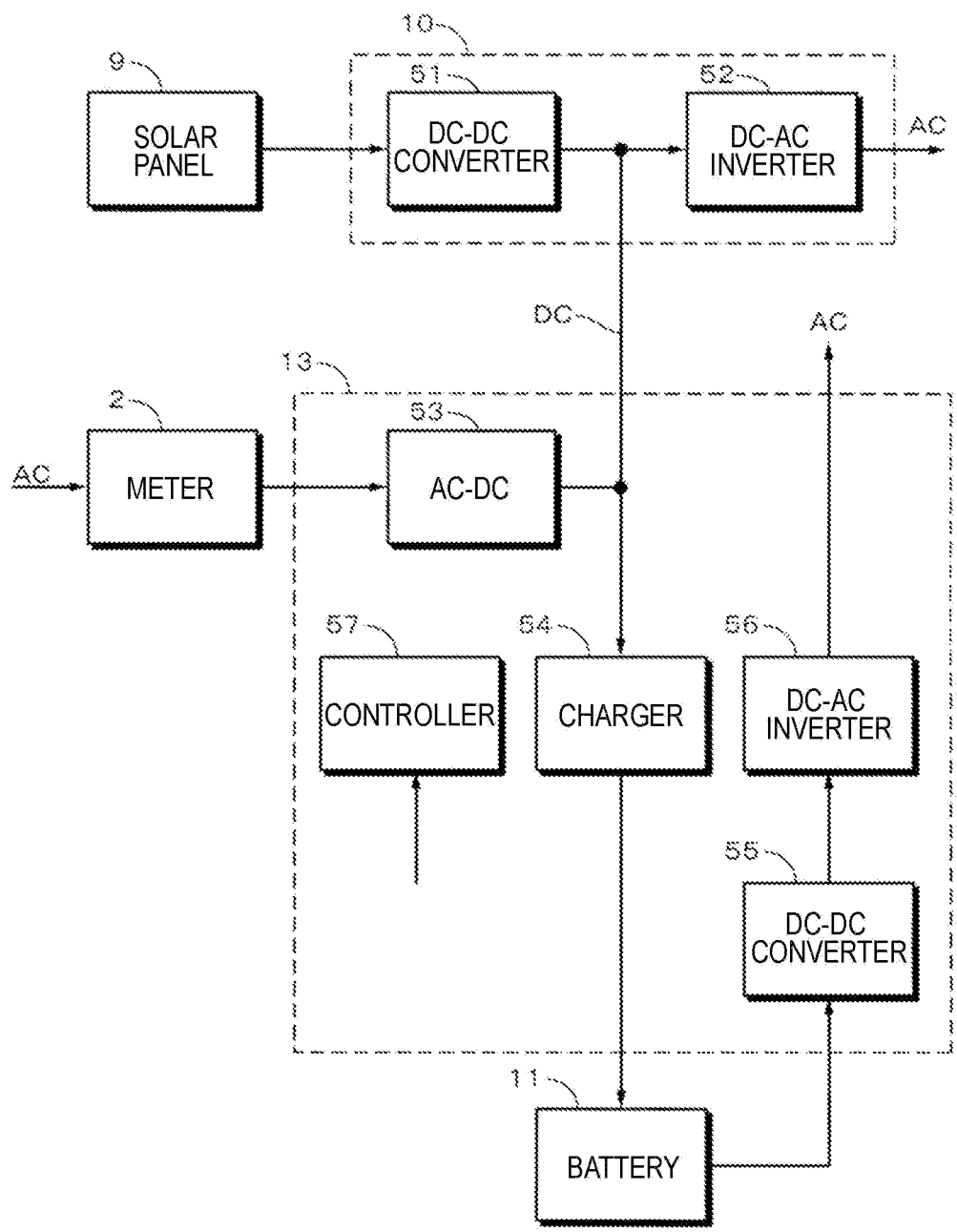
FIG. 5 is a block diagram used for explaining a power conditioner connected to a solar panel and a power storage device.

First and second power conditioners provided for the solar module 10 and the battery center 13, respectively, will be described with reference to FIG. 5. FIG. 5 illustrates a partial configuration of the battery center 13.

Direct-current power generated by the solar panel 9 is supplied to a DC-DC converter 51 and output as a predetermined direct-current voltage. The output voltage of the DC-DC converter 51 is supplied to a DC-AC inverter 52. The DC-AC inverter 52 has a configuration of a GTI (Grid Tie Inverter), for example, and outputs alternating-current power in synchronization with alternating-current power from the power supply network at the output end.

Since the amount of power generation by the solar panel 9 varies depending on the weather, the time zone and the like, the DC-DC converter 51 is used to stabilize the input voltage of the DC-AC inverter 52 when the output voltage of the solar panel 9 is supplied to the DC-AC inverter 52. Furthermore, the DC-DC converter 51 is configured to adjust the output impedance to the impedance of the solar panel under input light at any given time. This characteristics of tracking the peak load on the solar panel 9 is known as MPPT (Maximum Peak Point Tracking: a function for maximum peak point tracking control that is control to track a peak point of output power from the solar panel).

Furthermore, the DC-DC converter 51 and the DC-AC inverter 52 having the GTI configuration are required to be on the assumption that an AC line receives power from another power source before transmission of power. This is for the reason of ensuring the safety of engineers working with the wiring network. Owing to this characteristic, there is a certain amount of delay between DC input to and AC output from the DC-AC inverter 52.

Alternating-current power from the power meter 2 is converted into direct-current power by a rectifying circuit 53 of the battery center 13. The direct-current power from the DC-DC converter 51 of the solar module 10 and/or the direct-current power from the rectifying circuit 53 of the battery center 13 are supplied to a charger 54. The batteries of the power storage device 11 are charged by the charger 54.

The power storage device 11 is the same as the solar panel in generating direct-current power, and a power conditioner is also connected to the output of the power storage device 11. Specifically, direct-current power generated by the power storage device 11 is supplied to a DC-DC converter 55. Predetermined direct-current power from the DC-DC converter 55 is supplied to a DC-AC inverter 56. Alternating-current power output by the DC-AC inverter 56 is supplied to an alternating-current power system at home. The DC-AC inverter 56 has the configuration of the GTI.

As described above, in a configuration in which the batteries can be inserted into and removed from the battery center 13, authentication is made between the battery center 13 and the batteries before charging and discharging the batteries, and charging and discharging are performed only when the authentication is successful. In the authentication, IDs of the batteries are used.

In order to control respective components of the battery center 13 for such authentication, charging operation and discharging operation, a controller 57 and a wireless communication unit (not illustrated) are provided in the battery center 13. The controller 57 is composed of a microcomputer. The DC-DC converter 55 and the DC-AC inverter 56 described above constitute the first power conditioner, and the DC-DC converter 51 and the DC-AC inverter 52 of the solar module 10 constitute the second power conditioner. Circuit blocks having the same configuration are used to constitute these power conditioners for the reasons of the consistency of control and the availability.

Figure 6:
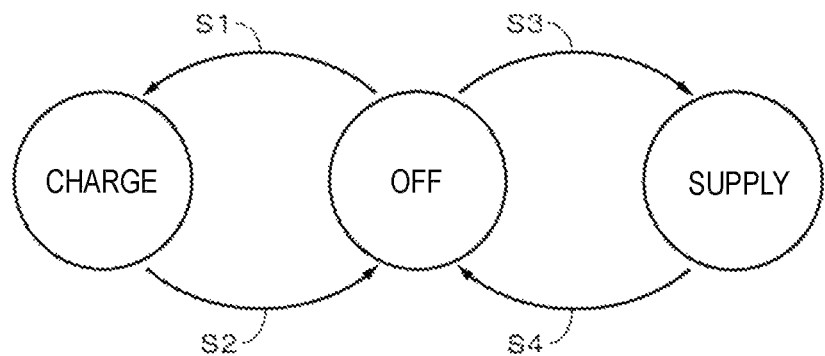
FIG. 6 is a state transition diagram used for explaining processing to control charging and discharging of the storage device.

An example of control on charging/discharging performed by the controller 57 will be described with reference to FIG. 6. FIG. 6 illustrates three states of charge, off and supply (distribution).

Condition for transition S1 from "off" to "charge": (solar panel output≥150 W) and (state of charge<90%)

Condition for transition S2 from "charge" to "off": (solar panel output<150 W) or (state of charge≥90%)

Condition for transition S3 from "off" to "supply": (load on electrical appliances≥50 W) and (state of charge≥25%) or (solar panel output≥150 W) and (state of charge<90%)

Condition for transition S4 from "supply" to "off": (load on electrical appliances<50 W) or (state of charge<25%).

Control of charging/discharging described above is an example of control of charging the power storage device 11 only by solar panel output, and other control methods are possible when the power storage device 11 can be charged according to the output of the rectifying circuit 53 described above. Furthermore, the values of the thresholds for determination are exemplary only, and may be set to various values.

As described above, with the DC-DC converter 51 and the DC-AC inverter 52, there is a certain amount of delay between DC input to and AC output from the DC-AC inverter 52. The output voltage from the power storage device 11, however, is desired to be capable of immediately supplying power in response to a request.

To satisfy such requests, the DC-DC converter 55 is configured to have two output voltages. The first output voltage is a standby voltage. The standby voltage is lower than a threshold at which the DC-AC inverter 56 starts power supply to outside but a voltage sufficient for the DC-AC inverter 56 to operate. The second voltage is a voltage at which the DC-AC inverter 56 starts power supply to outside. The DC-DC converter 55 outputs the first voltage at which the DC-AC inverter 56 is in standby so that the DC-AC inverter 56 can immediately enter the supply mode.

The DC-DC converter 51 has the function of maximum peak point tracking as described above. Similarly, the DC-DC converter 55 to which the output voltage of the power storage device 11 also has the function of maximum peak point tracking. The power storage device 11 has an output characteristic different from that of the solar panel. Accordingly, when the DC-DC converter 55 connected to the power storage device 11 has the function of maximum peak point tracking, the system (power supply to the AC line) becomes unstable. The DC-DC converter 55 is therefore configured so that the output impedance thereof dynamically varies following a load curve of the solar panel.

In a system including one DC-AC inverter (GTI) for a plurality of batteries and a plurality of DC-DC converters, the simulation of the load curve means that a plurality of outputs from the DC-DC converters is simply connected in parallel.

<2. Modified Examples>

While an embodiment of the present invention has been described in detail, the present invention is not limited to the above described embodiment by various modifications based on the technical ideas of the present invention are possible. For example, the power controller system can be applied not only to home but also to a divided area.

REFERENCE SIGNS LIST

1 Power supply network
2 Power meter
4 Gateway
5 Appliance monitor
9 Solar panel
10 Solar module
11 Power storage device
13 Battery center
14 Display
51, 55 DC-DC converter
52, 56 DC-AC converter

The invention claimed is:

1. A power control device comprising:
a direct-current power storage;
a first power conditioner connected to the storage;
a direct-current power generator;
a second power conditioner connected to the generator; and
an alternating-current power system to which alternating-current power from the first power conditioner is supplied and to which alternating-current power from the second power conditioner is supplied, wherein
the first power conditioner includes a first DC-DC converter and a first DC-AC inverter, the first DC-DC converter is configured to generate first and second outputs, wherein the first output makes the first DC-AC inverter enter a standby state, and the second output makes the first DC-AC inverter output alternating-current power to the alternating-current power system.

2. The power control device according to claim 1, wherein the first DC-DC converter of the first power conditioner and a second DC-DC converter of the second power conditioner have a function of maximum peak point tracking control.

3. The power control device according to claim 1, wherein direct-current power is stored in the storage by direct-current power generated by the generator.

4. The power control device according to claim 1, wherein the first and second power conditioners are configured to supply alternating-current powers in synchronization with each other to the alternating-current power system.

5. The power control device according to claim 1, wherein the generator is a photovoltaic power generator.

6. The power control device according to claim 1, wherein the second power conditioner comprises a second DC-DC converter and a second DC-AC inverter.

7. The power control device according to claim 1, wherein the first output of the first DC-DC converter is lower than a predefined threshold and the second output of the first DC-DC converter is equal to or higher than the predefined threshold.

* * * * *